United States Patent [19]
Phillips, Jr.

[11] 4,362,835
[45] Dec. 7, 1982

[54] COMPOSITION OF PELLETIZED AND POWDERY LLDPE AND LIQUID POLYOLEFIN FOR THE PRODUCTION OF FILM

[75] Inventor: Martin A. Phillips, Jr., Stow, Ohio

[73] Assignee: The Goodyear Tire & Rubber Company, Akron, Ohio

[21] Appl. No.: 213,806

[22] Filed: Dec. 8, 1980

[51] Int. Cl.³ .................. C08J 3/18; C08L 23/04; C08K 5/01

[52] U.S. Cl. ........................... 524/317; 525/240; 524/375; 524/491; 524/528

[58] Field of Search ............ 525/240; 260/33.6 PQ; 524/491, 528

[56] References Cited

FOREIGN PATENT DOCUMENTS 11930 6/1980 European Pat. Off.
4954472 5/1974 Japan.

OTHER PUBLICATIONS

Chem. Abstract, vol. 82, 4993s, 1975, (Abstract of Ja. Kokai 49-54472).

"Materials & Compounding Ingredients for Rubber", Rubber World, pub. 1975.

Primary Examiner—Carman J. Seccoro
Attorney, Agent, or Firm—J. D. Wolfe

[57] ABSTRACT

The invention relates to compositions suitable for forming a film by a bubble extrusion process comprising a blend of a pelletized linear low density polyethylene containing from 0 to about 15 mol percent of a comonomer of a mono-olefin having 3 to 12 carbon atoms, 0 to about 20 mol percent of a pelletized low density polyethylene, 20 to 25 mol percent of a powdery linear low density polyethylene containing from 0 to about 15 mol percent of a comonomer of a mono-olefin having from 3 to 12 carbon atoms and 1 to 10 mol percent of a liquid polyolefin.

8 Claims, No Drawings

COMPOSITION OF PELLETIZED AND POWDERY LLDPE AND LIQUID POLYOLEFIN FOR THE PRODUCTION OF FILM

TECHNICAL FIELD

This invention relates to compositions suitable for forming a film by a bubble extrusion process comprising a blend of a pelletized linear low density polyethylene containing from 0 to about 15 mol percent of a comonomer of a mono-olefin having 3 to 12 carbon atoms, 0 to about 20 mol percent of a pelletized low density polyethylene, sufficient and preferably about 20 to 25 mol percent of a powdery linear low density polyethylene containing from 0 to about 15 mol percent of a comonomer of a mono-olefin having from 3 to about 12 carbon atoms and 1 to 10 mol percent of a liquid polyolefin, with the preferred polyolefin being polybutene.

BACKGROUND ART

Recently linear low density polyethylenes have become available in pelletized form and they have properties which render them desirable for use in making film by the bubble extrusion process. Unfortunately high clarity, high tack film which is essential to food packaging and pallet wrap films can only be accomplished with such LLDPE resins by chill roll casting or similar techniques which employ chilled rolls or mandrels for rapid cooling of the molten extrudate.

DISCLOSURE AND PRACTICE OF THE INVENTION

I have discovered how to compound the linear low density polyethylenes containing from 0 to about 15 mol percent of a comonomer of a mono-olefin having 3 to about 12 carbon atoms whereby it can be used on blow extrusion film equipment to produce film suitable for such uses as a stretch pallet wrap or as a food contact wrap where high clarity and tack are essential. Also the films produced from my composition have the desired clarity and tack without the need to use special chill rolls.

This compounding can be done in the conventional manner such as by stirring the ingredients together, viz during extrusion or in a tumbler, but a preferred practice is to premix certain of the ingredients before making the final blend. In the preferred method a Blend A and a Blend B are made and these are blended to give a Blend C that is the feed from the hopper to the screw of said extruder that forces the composition as a tubular film from the die where the air blows the film in the normal manner before it is wrapped, preferably after being slit on a mandrel to give a roll of film. Generally Blend A comprises a mixture of a liquid polyolefin, preferably of the polybutenes, with a powdery linear low density polyethylene containing from 0 to about 15 mol percent of a comonomer of a mono-olefin having from 3 to 12 carbon atoms such as propylene, butene, amylenes, hexenes, etc. with insufficient liquid polyolefin to render the mass a fluid at atmospheric pressure and a temperature of about 40° C., viz about 1 to 15 mol percent, and preferably 3 to 10 mol percent.

The second component of the blend is pelletized linear low density polyethylene and preferably it is blended with as much low density polyethylene as possible to give a lower cost extruding composition consistent with obtaining satisfactory clarity and other physical properties.

The linear low density polyethylenes are available commercially as pellets in several grades, viz containing varying amounts of the comonomer such as propylene, butene, pentene or hexenes as specifically represented by Dowlex TM 2045 having a melt index (gram/10 minutes) of 1 and a density (gram/cubic centimeter) of 0.920 or Unipel TM linear low density polyethylene of about 0.918 to 0.920 density.

The low density polyethylenes are produced by conventional high pressure process, are well known and available from a number of commercial sources. Likewise the liquid polyolefins are available as oils in many grades, as resins under various trade designations such as Wing-Tack TM and Piccolite TM resins.

While certain representative embodiments and details have been shown for the purpose of illustrating the invention it will be apparent to those skilled in this art that various changes and modifications may be made therein without departing from the spirit or scope of the invention.

I claim:

1. A blend of a pelletized linear low density polyethylene containing from 0 to about 15 mol percent of a comonomer of a mono-olefin having 3 to 12 carbon atoms, 0 to about 20 mol percent of a pelletized low density polyethylene, 20 to 25 mol percent of a powdery linear low density polyethylene containing from 0 to about 15 mol percent of a comonomer of a mono-olefin having from 3 to 12 carbon atoms and 1 to 10 mol percent of a liquid polyolefin.

2. The blend of claim 1 wherein the liquid polyolefin has a viscosity at 100° C. of 80 to 4500 centistakes.

3. The blend of claim 1 wherein the blend contains 3 to 5 parts per 100 parts of a food grade surfactant.

4. The blend of claim 3 wherein the surfactant is a glycerol mono fatty acid ester.

5. The blend of claim 3 wherein the surfactant contains an ethoxidized nonyl phenol.

6. The blend of claim 1 wherein the powdery linear low density polyethylene has a particle size capable of passing a No. 20 U.S. Screen.

7. The blend of claim 1 wherein the liquid polyolefin is a polybutene.

8. The blend of claim 7 wherein the polybutene has a viscosity at 100° C. of 80 to 4500 centistakes.

* * * * *

UNITED STATES PATENT OFFICE
CERTIFICATE OF CORRECTION

PATENT NO. : 4,362,835
DATED : December 7, 1982
INVENTOR(S) : Martin A. Phillips, Jr.

It is certified that error appears in the above-identified patent and that said Letters Patent are hereby corrected as shown below:

1. Column 2, line 25, add the following paragraph:

--The liquid polyolefin of claims 2 and 8 has a viscosity at 100°C of 80 to 4500 centistakes. The blend of this invention can contain surfactants, in the amount of 3 to 5 parts of a food grade surfactant such as glycerol mono-fatty acid ester and ethoxidized nonyl phenol per 100 parts of the blend. The powdery linear low density polyethylene used in claim 7 of this invention has a particle size capable of passing a number 20 U.S. Screen.--

Signed and Sealed this

Thirty-first Day of May 1983

[SEAL]

Attest:

DONALD J. QUIGG

Attesting Officer  Acting Commissioner of Patents and Trademarks